July 22, 1924.
G. E. MOLYNEUX
BRAKE MECHANISM FOR ROAD VEHICLES
Filed March 10, 1921    9 Sheets-Sheet 4
1,502,111
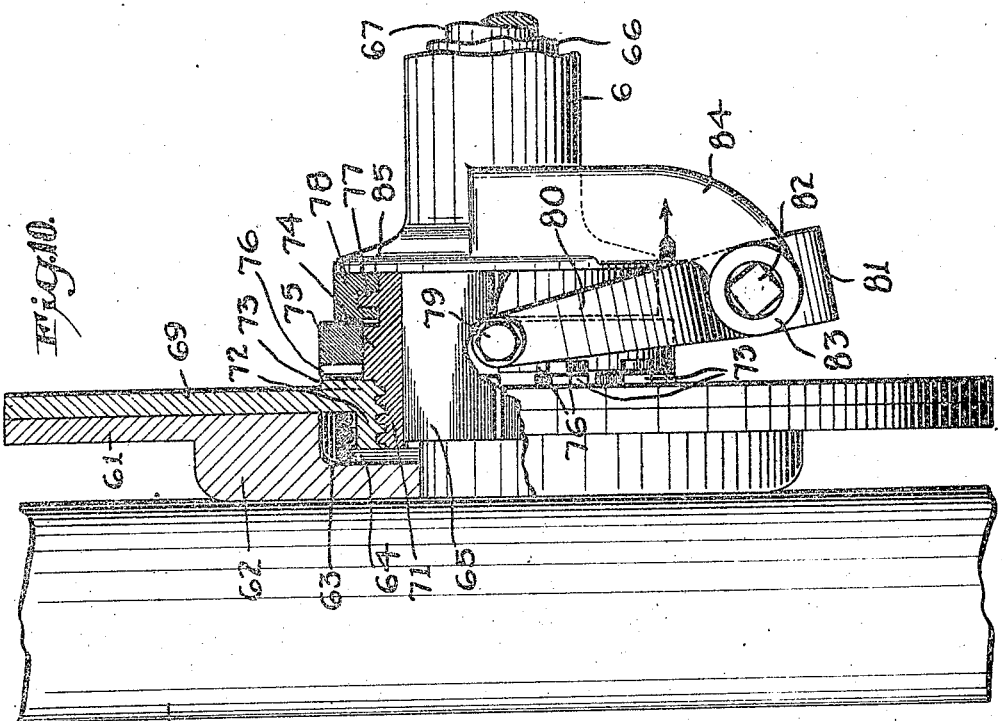
Inventor:
George E. Molyneux
By his Attorney
Chas. M. Chapman.

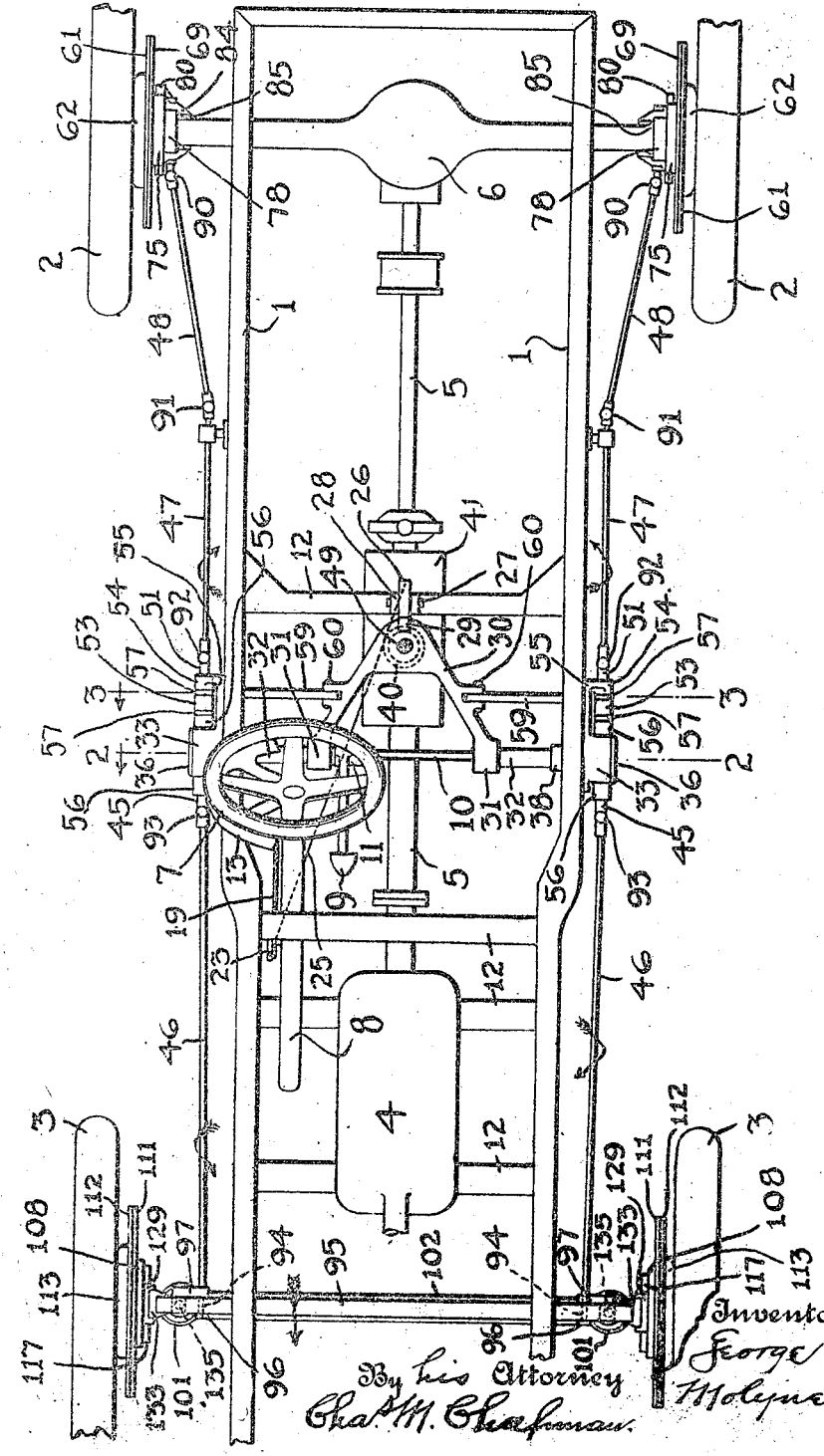

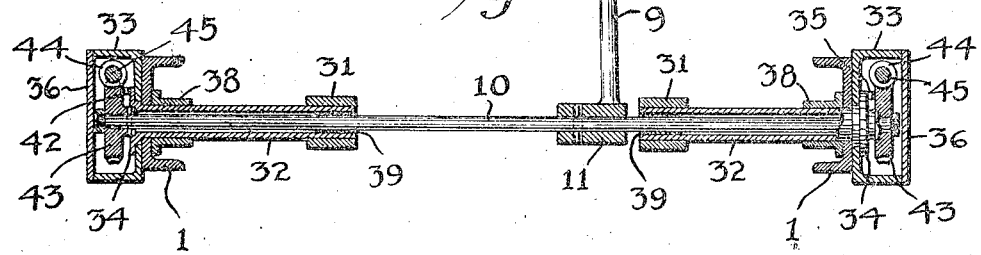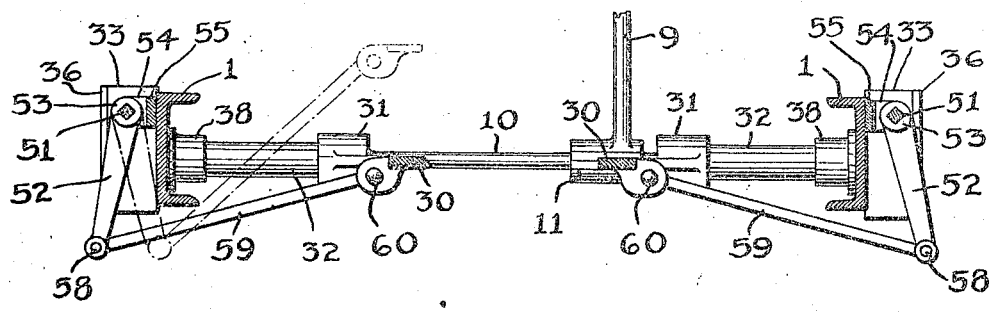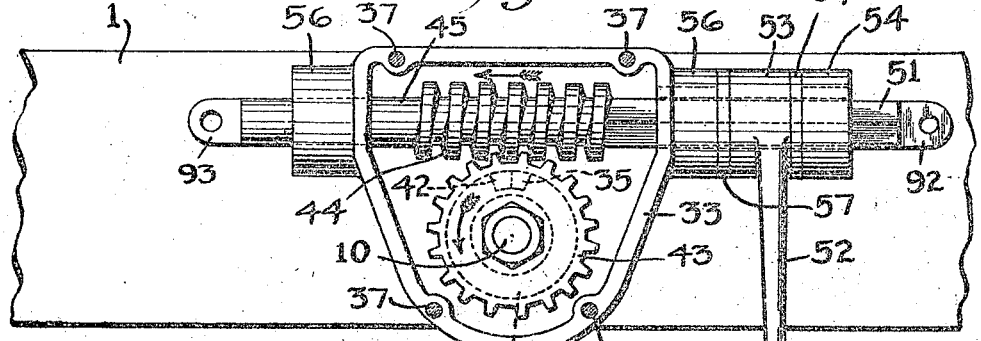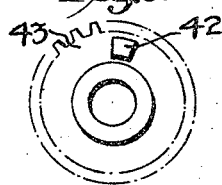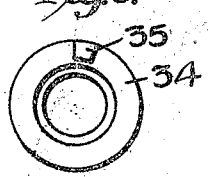

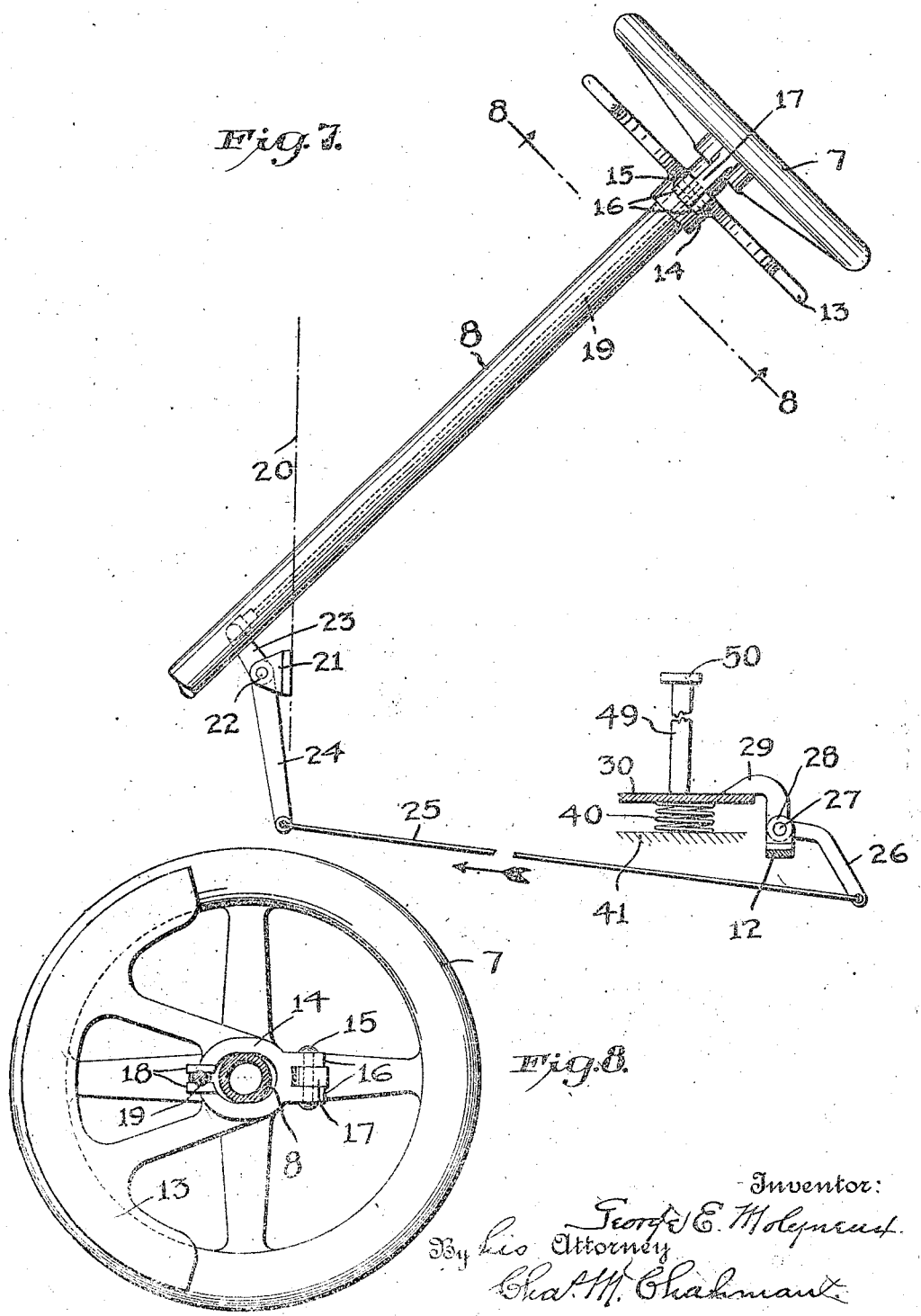

July 22, 1924.

G. E. MOLYNEUX 1,502,111

BRAKE MECHANISM FOR ROAD VEHICLES

Filed March 10 1921    9 Sheets-Sheet 5

Inventor
George E. Molyneux
By his Attorney
Chas. M. Chapman

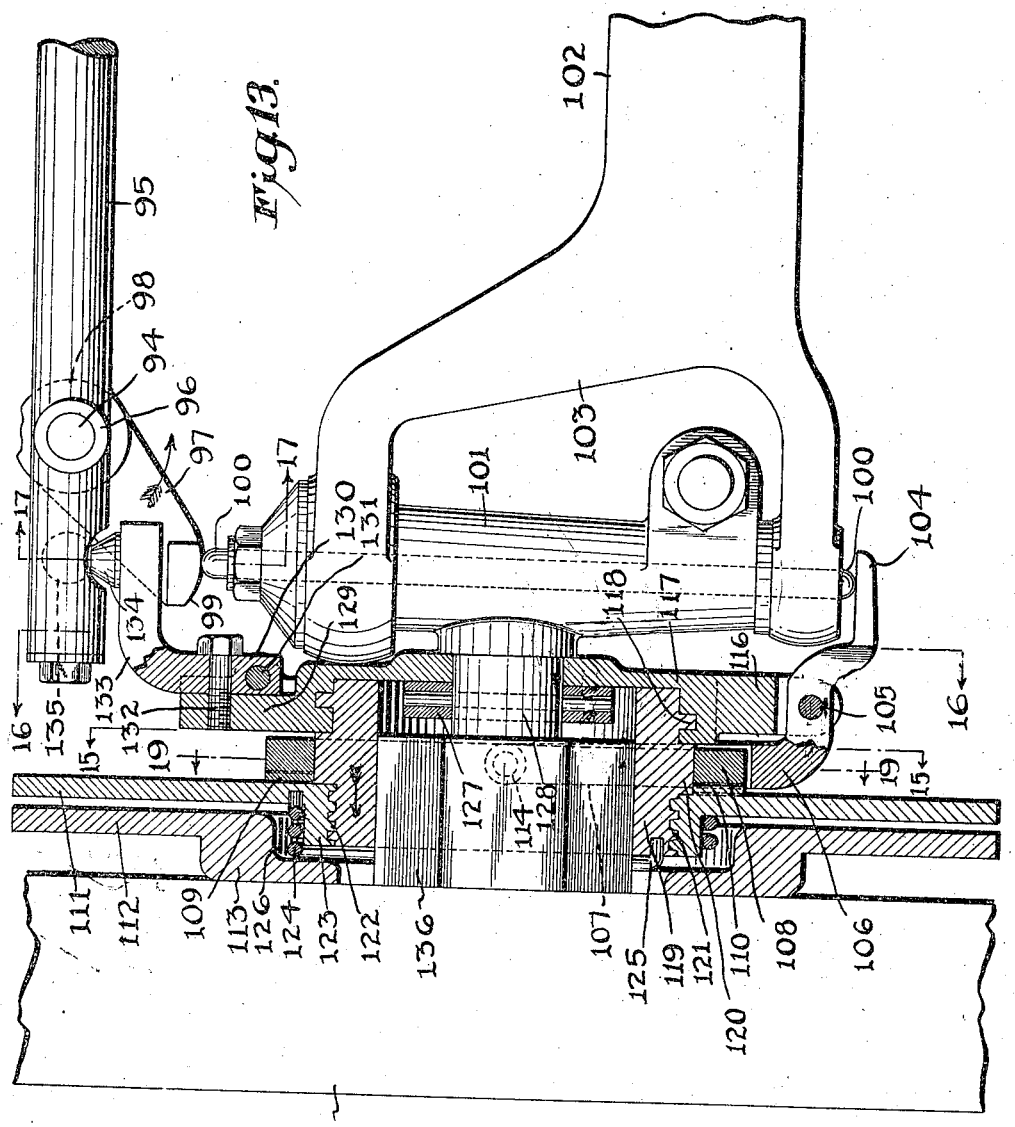

July 22, 1924.
G. E. MOLYNEUX
1,502,111
BRAKE MECHANISM FOR ROAD VEHICLES
Filed March 10, 1921    9 Sheets-Sheet 7
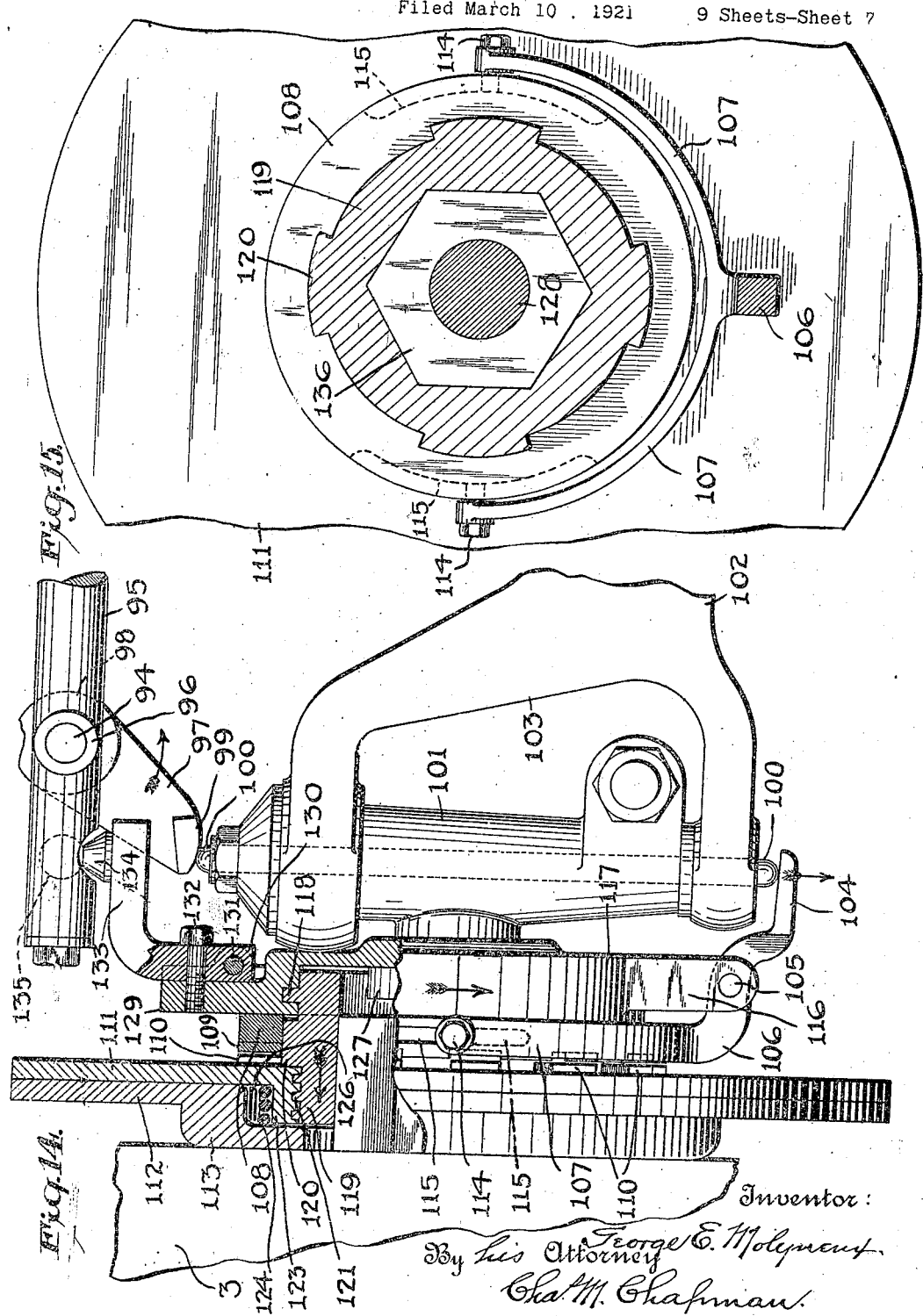
Inventor:
George E. Molyneux
By his Attorney
Chas. M. Chapman.

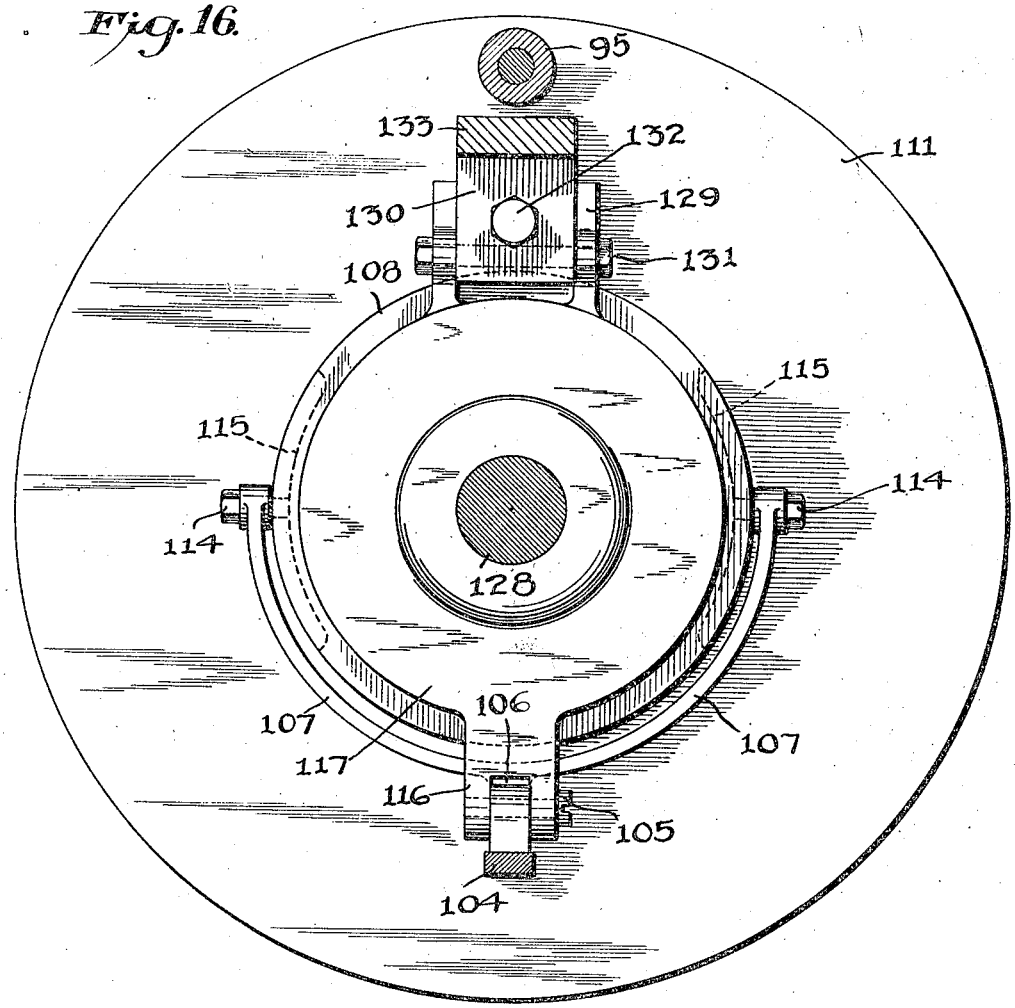
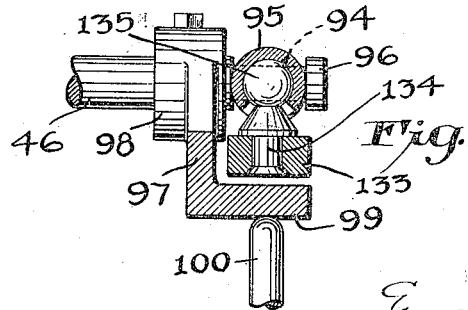

July 22, 1924.

G. E. MOLYNEUX 1,502,111

BRAKE MECHANISM FOR ROAD VEHICLES

Filed March 10, 1921    9 Sheets-Sheet 9

INVENTOR:
George E. Molyneux
BY
Chas. M. Chapman,
ATTORNEY.

Patented July 22, 1924.

1,502,111

UNITED STATES PATENT OFFICE.

GEORGE E. MOLYNEUX, OF BAYONNE, NEW JERSEY, ASSIGNOR OF ONE-HALF TO JOHN F. ALVORD, OF NEW YORK, N. Y.

BRAKE MECHANISM FOR ROAD VEHICLES.

Application filed March 10, 1921. Serial No. 451,131.

*To all whom it may concern:*

Be it known that I, GEORGE E. MOLYNEUX, a citizen of the United States, residing at Bayonne, county of Hudson, and State of New Jersey, have invented a new and useful Improvement in Brake Mechanism for Road Vehicles, of which the following is a description.

This invention has reference to brake mechanisms and particularly to a brake mechanism adapted for motor driven road vehicles such as automobiles or vehicles driven by hydrocarbon or other engines.

Among the objects of my invention may be noted the following: to provide a mechanism for braking road vehicles which can be applied by either hand or foot or by both; to provide a brake mechanism for vehicles which is adapted to all the wheels of said vehicle and can be applied to, or set in action on, all of said wheels simultaneously, and by either hand, or foot, or both; to provide a brake mechanism for vehicles which is adapted to be applied or set in action for braking purposes by hand for emergency purposes and by foot for service purposes; to provide a brake mechanism adapted to be applied to all the wheels of a vehicle at once, and to be used as a service brake by foot manipulation and as an emergency brake by hand manipulation; to provide a brake mechanism adapted to all the wheels of a vehicle and to be simultaneously operated, and which, for functional purposes, may be set in operation, and, after being so set, will apply friction in rapidly increasing increment as long as the vehicle remains in motion, or until the vehicle is brought to a standstill; to provide a brake mechanism applicable to all the wheels of a vehicle and to be applied either as a service or as an emergency brake and which is caused to increase its braking action upon the wheels in increasing increment as long as the vehicle continues to move; to provide a brake mechanism for vehicles of a character such that its braking area is in proportion to its diameter, and can be predetermined, and every part of which is serviceable as a braking area or surface; to provide a brake mechanism applicable to road vehicles, and to any or all wheels thereof, which is composed of two disk-like braking surfaces, the entire adjacent surface area of which is available for braking purposes; to provide a brake mechanism, for road vehicles of the automobile type, which can be applied to the front wheels as well as to the rear wheels and which, at one time, can be so applied as to act as a service brake, and, at another time, so applied as to act as an emergency brake, the application of the brakes in either instance being with reference to all the wheels of the vehicle which are equipped, simultaneously; to provide a brake mechanism for automobiles adapted to all the wheels in such manner that the higher the speed of the vehicle the quicker the brakes will be applied, that is, owing to the characteristics of the brake mechanism. high speed of the vehicle means rapid operation of the friction-applying members and the rapidity of operation of the friction-applying members is proportional to the speed of the vehicle; to provide a brake mechanism of such character, applicable to all the wheels of an automobile, and which is so operated, as to prevent skidding of the vehicle under any circumstance, the parts of the brake mechanism being set and arranged so as to render it capable of being adjusted to bring about simultaneous operation and application with approximate uniformity of movement of all the friction-applying devices of the several brake members; and to provide a brake mechanism for road vehicles which is simple, effective, strong, durable, easily manipulated, and quickly responsive both in operation and application of friction and relief thereof.

With the foregoing objects in view and others which will be detailed during the course of this description, my invention consists in the parts, features, elements and combinations thereof hereinafter described and claimed.

In order that my invention may be clearly understood, I have provided drawings wherein:

Figure 1 is a top plan view of the chassis of an automobile, parts being broken away on account of the limitations of the sheet, my invention being shown applied thereto, and on all four wheels, and the body of the vehicle, including the floor, being omitted;

Figure 2 is a sectional view of a detail of operating mechanism taken substantially on the line 2—2 of Figure 1, the arrow indicating the direction of view;

Figure 3 is a sectional view of a detail of the operating mechanism, the section being taken substantially on the line 3—3 of Figure 1, the arrow indicating the direction of view;

Figure 4 is an enlarged view showing in side elevation the structure of Figure 1, the detail being at the operating means where the sections of Figures 2 and 3 are taken, and the face-plate of the housing, secured to the side of the chassis, being removed to disclose interior parts;

Figure 5 is an inner face view of the driving pinion of Figure 4;

Figure 6 is a face view of the cooperating driving disk of Figure 4;

Figure 7 is a detail of the steering post and the hand operating means for setting the brake mechanism in action, parts being broken away and parts being in section in order to curtail the view;

Figure 8 is a cross-section substantially on the line 8—8 of Figure 7, the arrows indicating the direction of view;

Figure 9 is a sectional view taken centrally at the rear wheel brake parts, showing details of the brake mechanism, the view being from the rear of the vehicle, Figure 1, looking forward, and showing the brake disks separated and ready for a friction-applying movement of the actuating means; section being on line 9—9, Figure 11;

Figure 10 is a view similar to Figure 9 showing more of the parts in elevation, and also showing the brake disks in contact, as when set in operation by the emergency operating means, and operating to apply friction in increasing increment under continued movement of the vehicle;

Figure 13 is a sectional elevation of the brake mechanism applied to the front wheels of the vehicle, the view being from the front of the vehicle looking rearwardly and including an elevation of the steering knuckle or joint, the friction disks being shown separated and the parts being in position ready to be actuated for braking action;

Figure 14 is a view similar to Figure 13 more of the parts being shown in elevation, and the friction-applying disks being shown in contact, as when set in operation by the emergency operating means, operating to apply friction in increasing increment as the motion of the vehicle continues;

Figure 15 is a sectional view substantially on the line 15—15 of Figure 13, the arrows indicating the direction of view;

Figure 16 is an enlarged sectional view taken substantially on the line 16—16 of Figure 13, the arrows indicating the direction of view;

Figure 17 is a sectional view substantially on the line 17—17 of Figure 13, the arrows indicating the direction of view;

Figure 11:
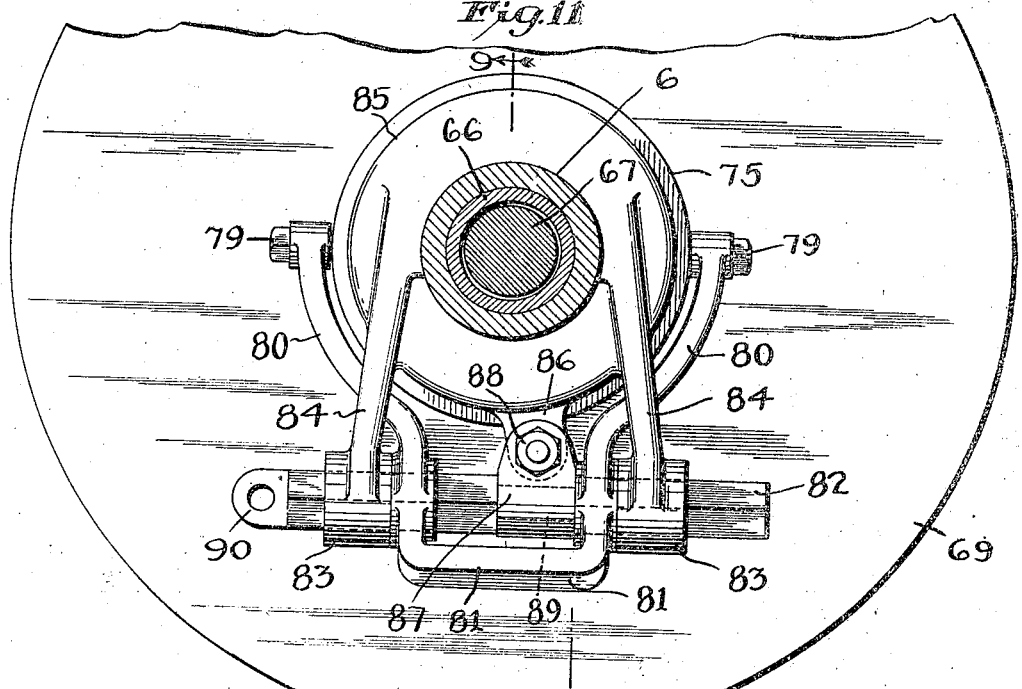
Figure 11 is a section on the line 11—11 of Figure 9, the arrows showing the direction of view.
Figure 12:
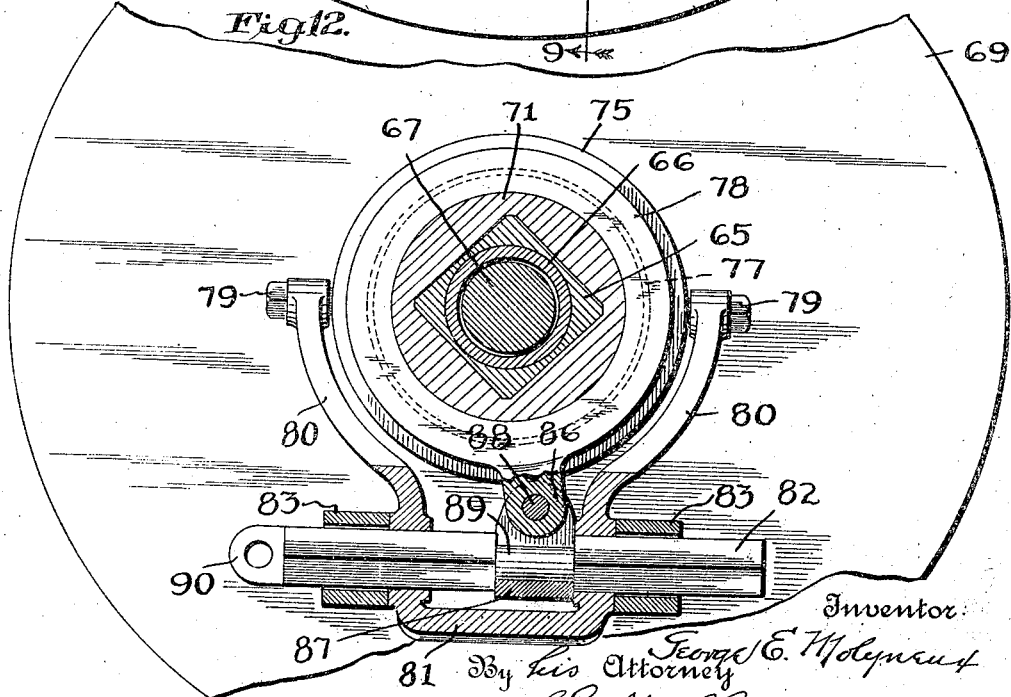
Figure 12 is a section on the line 12—12 of Figure 9, the arrows indicating the direction of view.

In the following description, distinction will be made between the operating means, which are under manual and foot control of the operator, the brake actuating means set in action by the operating means, and the brake mechanisms set in operation by the actuating means. These three mechanisms will be distinguished from each other in order that the three groups may be readily understood and also for convenience of description and succinct statement in the claims. Also, the description, for simplicity, will set forth the brake operating mechanism, the brake actuating mechanism, and the two brake mechanisms as applied on one side of the vehicle, it being understood that such mechanisms are duplicated on the opposite side of the vehicle. Furthermore, it should be understood that the brake mechanism, as applied to the rear wheels of the vehicle, is different in detail from the brake mechanism as applied to the front wheels of the vehicle; but, that both sets of brake mechanisms are actuated by similar trains of mechanism on opposite sides of the vehicle. It should also be understood that there is but one treadle-operated means for setting the two trains of actuating mechanism in operation and for actuating the four brake mechanisms; also, that there is but one manually operated means for setting the two trains of actuating mechanism in operation and for actuating the four brake mechanisms.

Referring to the drawings, the numeral 1 indicates the chassis of an automobile, for example, my invention being shown as embodied in an automobile, merely as an example of a use thereof. The rear or driving wheels are indicated by 2, and the front or steering wheels are indicated by 3. 4 indicates the engine, conventionally shown, and the transmission shafting is indicated by 5, the same transmitting the motive power of the engine in the usual way to the rear axle, the gearing and axle being incased in conventional manner as indicated at 6. The steering wheel is indicated at 7, steering post 8, brake pedal 9 securely fastened to transverse shaft 10, as by a collar or enlarged hub 11. Transverse braces of the chassis are indicated at 12, of which there are several, according to usual types of construction. Referring to Figures 1 to 8, inclusive, the steering post is provided below the hand wheel 7 with an emergency operating sector 13, the position of which is such as to be readily accessible to the operator and quickly gripped by the fingers of either hand, as occasion requires or emergency demands. The sector 13 is provided with a hub 14, which loosely encircles the steering post 8 and the aperture in which is somewhat elongated, in order to permit of free pivotal movement of the sector 13 around the pivot pin 15, which passes through apertured ears 16, and through an apertured lug 17 depending from the wheel 7. Thus the sector may have freedom of movement, relatively to the steering wheel and post, about the pivotal pin 15. The hub 14 is provided opposite its pivotal point with a clamp 18 of any desired form adapted to pivotally engage the upper end of a rod 19 which extends along, and parallel with, the post 8, both the post and rod extending through the dash-board 20, or similar partition, shown by dot and dash line in Figure 7. The dashboard 20 has rigidly secured to it a bracket 21, to which a lever is pivoted at 22, the short arm 23 of which is pivotally connected to the rod 19, and the long arm 24 of which extends to a point a suitable distance below the floor of the car between the side bars of the chassis, and, at its lower end, has loosely connected thereto a flexible cable 25, which, at its opposite end, is connected to the depending arm 26 of a latch-lever fulcrumed at 27 to the rear brace-bar 12, the pivotal pin being carried by an upstanding, bifurcated bracket 28 located approximately centrally of said brace-bar and on the top thereof. The other arm of the lever is formed with an overhanging latch or catch 29, which engages the upper surface of a V-shaped frame 30 at its vertex, the wide-spread arms of which frame are formed into collars 31 at their free ends, each of which is rigidly secured to a sleeve 32 encircling the shaft 10 and extending from said collars through the side adjacent bar of the chassis, in which it has bearing and is journaled, and also extending through the inner wall of a casing 33 rigidly secured to the outside of the said chassis bar, and at its terminal carrying a disk 34 provided with a lug 35. The faceplate 36 of the casing 33 is removable and may be secured in position in any suitable way, as by screws 37, the bodies of which are shown in section in the enlarged view, Figure 4. The sleeves 32 are each sustained near its outer end by an extension bearing 38 secured rigidly to the inside of the adjacent chassis bar, and, at its inner end, is provided with a bushing 39 which encircles the shaft 10, the said bushing 39 and bearing 38 rigidly supporting and maintaining the sleeve 32 from twist or strain. Under the frame 30 an expansion spring 40 is mounted on a fixed part of the chassis or a frame secured thereto and indicated conventionally at 41, the normal action of the spring 40 being to press the frame vertically into contact or engagement with the latch 29. The spring 40 is held under compression, as shown in Figure 7, ready to quickly and forcibly lift the frame 30, when released by the latch-lever, which is tripped out of engagement with the frame 30, this action being brought about by manipulating the emergency sector 13 which will draw the rod 19 upwardly toward the steering wheel 7, the said rod in turn swinging the lever 23—24 on its fulcrum 22, causing the cable 25 to be drawn in the direction of the arrow, Figure 7, thus swinging the latch-lever on its fulcrum 27 and lifting the overhanging catch 29. Soon as the latch is shifted out of the way as just described, the expansive force of the spring 40 will throw the frame 30 vertically, as shown at the left side of Figure 3, and swing it about its axis 10, such action causing the rotation of the disk 34 and its lug 35 causing the rotation of the lug 42 and the pinion 43, carried at the outer end of the shaft 10 in the casing 33 secured to the side of the chassis. The actuation of the pinion 43, by contact of the two lugs 35—42, causes the teeth of the pinion to engage the rack 44 of the bar 45, which is journaled to slide, as well as rotate, in the frame 33, thus imparting to the bar 45 longitudinal movement in the direction of the adjacent arrow, Figure 4. Actuation of the pedal 9 by the foot pressing thereon will rotate the shaft 10, which will actuate the pinion 43 and cause the lug 42 to move away from the lug 35 on the disk 34, this also giving longitudinal movement to the slide-bar 45, in the direction of the adjacent arrow, when required. The actuation of the bars 45, as just described, imparts longitudinal movement to the connecting rods 46, 47 and 48 on opposite sides of the chassis, thus setting in action the friction-applying means of the brake mechanisms mounted relatively to all four wheels of the vehicle. Details of such mechanisms will be set forth presently. The frame 30, after release by the latch, is returned to normal position by means of a rod 49 which extends through the floor of the car and normally rests by gravity upon the top surface of the frame 30 just in advance of the catch part 29 of the lever. The rod is provided with a flat head 50 adapted to receive pressure from the foot of the operator in the car, the same being accessibly presented to the operator, so that he can readily set his heel upon the bar to press the same when desired. As the frame is thus pressed downwardly, the spring 40 is compressed and the inclined top of the catch 29 is passed, and the latter will gravitally swing back into position to re-engage the frame 30, as shown in Figure 7. The return of the frame 30 gravitally to normal position reverses the rotation of the disk 34, and the return of the treadle 9 to normal position, as by the usual spring, reverses the rotation of the pinion 43. When the emergency sector 13 is set in operation, as just described, the pedal 9 will be automatically depressed, and the spring normally operating thereon to return it to normal position will aid the return of the frame 30 by contact of lug 42 with lug 35, the one driving the other back to normal position shown in Figure 4. Each of the slide-bars 45 is made round at one end and polygonal at the other end, as at 51, said polygonal part having mounted thereon an arm 52, the hub 53 of which is formed with a correspondingly shaped bore, whereby, when the arm 52 is turned, the slide-bar 51 will be likewise turned or rotated. The polygonal part 51 of the slide-bar 45 operates freely in the bearing 54 of the bracket 55, and also in the bearing 56 extending from the adjacent side of the frame 33. Washers 57 are set between the bearings 54—56 to take up wear and hold the arm 52 in proper position. The arm 52, at its lower end 58, is pivotally connected to a link 59, extending under the chassis and pivotally connected at 60 to the adjacent arm of the frame 30. Thus, as the frame is released by the catch 29 and forced vertically by the spring 40, the arm 59 is drawn inwardly, thus drawing the arm 52 inwardly toward the side bar of the chassis, thus rocking the slide-bar 45 and giving an axial rotation to the connecting rods 46, 47 and 48. The functions of these several movements imparted to the rocking and sliding bar 45 will be presently set forth.

From the foregoing it will be seen that the braking devices applied to the several wheels of the vehicle are readily operated by two sets of mechanism, and that the operation involves two distinct motions imposed upon the slide-bars 45, one being a longitudinal reciprocation or right-line movement, and the other being a rocking or rotary movement relatively to the axis of the bar 45. It will also be seen that these devices, so far described, are set in action by the pedal 9, which is the service member of the brake-operating mechanism, or by the sector 13, which is the emergency member of the brake-operating mechanism, or said sector and pedal may be operated together or in quick succession in order to make doubly certain the actuation of the brake mechanism; but, the brake mechanism will not be so effectively applied by the service means as by the emergency means, and need not be so applied, while the emergency mechanism must be accessibly presented to the operator in such position that it can be operated or manipulated instantly and with little or no mental or physical effort, and must be most effectively applied. Hence, the emergency elements of the brake mechanism are made to be hand operated, and the manipulating device is placed conveniently in position for manipulation by the fingers of either hand without removing the hands from the steering wheel. And the emergency actuating mechanism must so operate upon the brake mechanism as to cause or enable it to be applied with increasing increment of friction as long as the vehicle is in operation. Thus the car is kept under perfect control and the brake mechanism can be applied instantly in any emergency, and, as will be presently shown, when the brake mechanism is once started into action, it continues in action as long as the vehicle moves, and, according to the speed of the vehicle, will go into action with more or less rapidity and with a constantly increasing increment of power or applied friction. The braking elements of the brake mechanism will now be described with reference to Figures 9 to 12, inclusive, as applied to the rear wheels of the vehicle.

Figure 18:
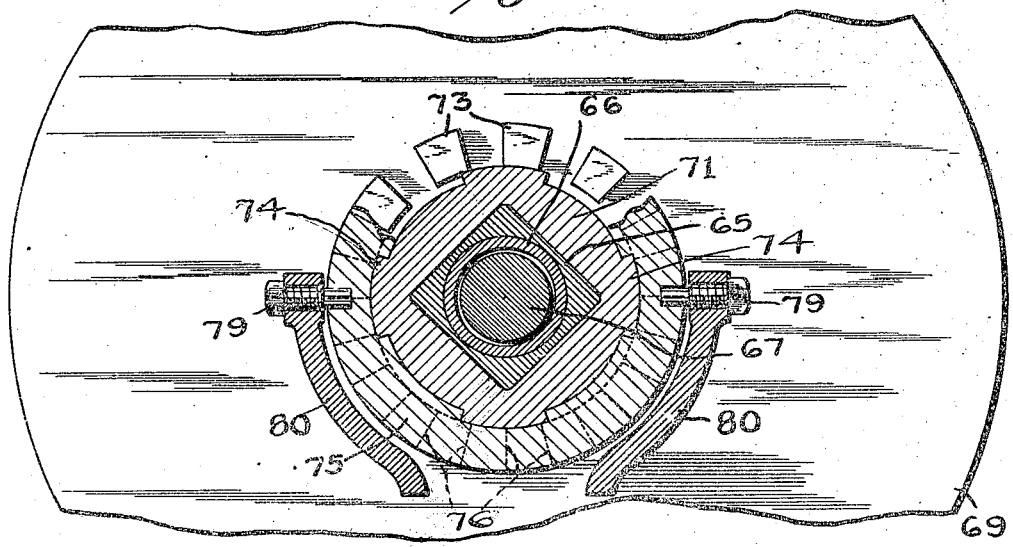
Figure 18 is a sectional view substantially on the line 18—18 of Figure 9, the arrows indicating the direction of view.
Figure 19:
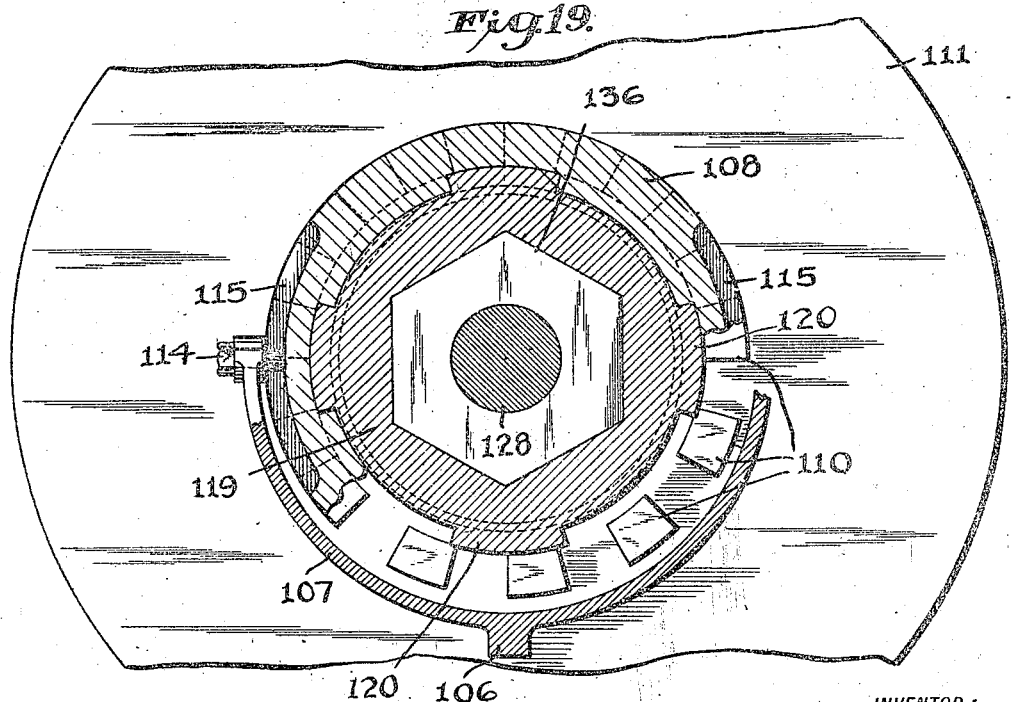
Figure 19 is a sectional view substantially on the line 19—19 of Figure 13, the arrows indicating the direction of view.

The rear wheels 2 have each rigidly applied thereto a brake disk or member 61, which may be formed with a hub or central strengthening portion 62, in a recess 63 of which is housed a coiled expansion and tortional spring 64, which surrounds the angular, tubular portion 65 of the casing 6, in which is a bushing 66, in which rotates the live axle 67, on which the wheels 2 are mounted. The outer end 68 of the spring 64 is secured to the brake disk 69, and the inner end 70 of the spring is secured to the threaded end of tubular slide 71. The hub 72 of the brake disk 69 is internally screw-threaded and extended inwardly so as to operate in the recess 63 of the brake member 61, the screw-threads coacting with screw-threads on slide 71. The outer face of the brake disk 69 is provided with a plurality of ratchet teeth 73, said ratchet teeth surrounding the hub 72 of the said brake disk and being formed as shown in Figure 18, said ratchet teeth being common to the two forms of brake mechanism applied to the rear and front wheels, respectively, as shown in Figure 19. The slide 71, next to the screw-threads, is provided with segmental enlargements 74, the diameter of which is greater than the diameter of the screw-threads, and cooperating with said enlargements is a ratchet ring 75, the inner face of which is provided with ratchet teeth 76 adapted to engage the ratchet teeth 73 on the brake disk 69. Adjacent the ratchet ring 75, the slide 71 is provided with a cam flange or ring 77, which is in the form of a spiral, and engaging with said cam flange 77 is a grooved ring 78 adapted to rotate upon the flange 77. The ratchet ring 75, at diametrically opposite points, has pivoted thereto at 79 the free ends of arms 80 forming a yoke, the body of which is formed into an angular loop 81 having its opposite sides keyed upon a polygonal slide-bar 82 and adapted to be rocked by said bar. The body of the yoke is confined between the two bearings 83 of arms 84, which are integral with the casing 6 surrounding the bushing 66, in which the live axle 67 rotates, said casing 6 having a circumferential flange 85 which confines the slide 71 and the cam ring 78. Thus, when the yoke 81 is swung by the angular bar 82, the ratchet ring 75 will be shifted relatively to the ratchet teeth 73 on the brake disk 69. The cam ring 78 has depending from its bottom an apertured lug 86, which is embraced by the two arms of a collar 87, a bolt 88 passing through the three parts forming a pivotal connection between the collar and the cam ring 78. The collar encircles a reduced, cylindrical portion 89 of the angular bar 82, thus forming shoulders on opposite sides of the cylindrical portion which prevent any relative longitudinal movement of the collar, the latter permitting the slide-bar 82 to rock. Hence, when the angular bar 82 is reciprocated, the collar is reciprocated with it, resulting in giving to the cam-ring 78 a rotary motion, which, by reason of the spiral formation of its groove and cooperating flange 77 on the slide 71, causes the latter to be shifted laterally on the casing 6, thus shifting the brake disk 69 relatively to the brake disk 61. On the other hand, if the ratchet ring 75 be in engagement with the ratchet teeth of the brake disk 69, the latter is withheld from rotary motion, and the said brake disk 69 is applied to the brake disk 61 merely by a right-line movement. If, however, the ratchet ring 75 is withdrawn from engagement with the ratchet teeth of the brake disk 69, by the emergency operating means, see Figure 10, the latter, under the influence of the cam-ring, is given a right-line movement to apply friction to the brake-disk 61, and, at the same time, the disk 69 is rotated on the slide 71, causing, by reason of the screw-threads between the two parts, the further movement of the brake disk 69 toward the brake disk 61 with rapidly increasing frictional contact, and, during this action, the spring 64 is wound up torsionally by reason of its opposite ends being fixed, respectively, to the slide 71 and the brake disk 69. And the greater the speed of the vehicle, the greater the pressure and friction between the two brake members, which pressure and friction increases with rapidly increasing increment as long as the vehicle continues in motion. It will now be understood that, when the ratchet ring 75 is caused to release the brake disk 69, which is brought about by the operation of the emergency hand-manipulated mechanism, the disks 69 and 61 engage each other with increasing pressure. When, however, the brake is to be applied, for service purposes, merely, the ratchet ring 75 is not released from the brake disk 69, see Figure 9, since the operation of the cam ring 78, under the influence of the service pedal 9, shifts the slide 71 only sufficiently to apply the friction of disk 69 to the brake disk 61 without breaking the engagement between the ratchet teeth 73 and 76. Hence, it will be understood that, when the emergency mechanism is operated, the release of the brake disk 69 by the ratchet ring 75 occurs instantly, while, when the service mechanism is actuated, the cam ring 78 simply shifts the brake disk 69 into contact with the brake disk 61 without disengaging the ratchet teeth 73, 76. Thus the brake mechanisms for the rear wheels are set in operation for service and emergency purposes.

The angular bar 82 is universally jointed at 90 to the rod 48, which latter is universally jointed at 91 to the rod 47, which in turn is universally jointed at 92 to the angular bar 51. The angular bar 51, at its opposite end, is universally jointed at 93 to the rod 46, which at its forward end, see Figures 13, 14 and 17, is reduced at 94 and passes through a cross-bar 95, near one end, and is prevented from receding from said cross-bar by a collar 96 on the extreme end thereof held rigidly against the cross-bar 95. Through this means, and the longitudinal reciprocation and rocking movement of the rod 46, the brake mechanisms adapted to the front wheels 3 are actuated for either emergency or service purposes. The said brake mechanism is adapted to the front wheels of the vehicle, as shown in Figures 13 to 17, inclusive. Viewing Figures 13, 14 and 17, the rod 46 is shown as provided with a crank-arm 97, the hub 98 of which is rigidly secured to the rod 46 just in rear of the reduced portion 94 thereof, and the crank arm 97 is provided with a cam member 99 extended at a right-angle thereto and adapted to cooperate with a longitudinally movable pin 100, which passes centrally through the journal 101 of the steering knuckle of the axle 102 of the front wheels, the latter being, as usual, extended into the bifurcation 103 embracing the journal sleeve 101 and through which the pin 100 extends. The pin 100, when operated upon by the cam member 99, depresses the arm 104 of a lever pivotally mounted at 105 and having its arm 106 extended into a yoke 107, which embraces the ring 108, the outer face of which is provided with ratchet teeth 109 adapted to engage the ratchet teeth 110 on the adjacent face of the brake disk 111, which cooperates with the brake disk 112 fixed rigidly, as by an enlargement 113, to the front wheel about its journal bearing. The yoke 107 has its opposite arms provided with pins or bolts 114 having smooth ends, adapted to run in grooves 115 in the ratchet ring 108. The pivotal point 105 for the yoke lever is in the bifurcated end 116 of a cam ring 117 provided with a groove in its inner circumference, adapted to engage the similarly formed flange 118 of the slide 119, having the arc-surfaces 120 on which the ratchet ring 108 operates, and also having the screw-threads 121 on the inner hub portion thereof adapted to engage the screw-threads 122 on the hub 123 of the brake disk 111, which hub is surrounded by a spiral spring 124, one end of which is fixed in the brake disk and the opposite end of which is fixed in the slide 119, as at 125. The spring is housed in the recess 126 of the enlargement 113 of the brake disk 112. The cam ring 117 is limited in its movement in one direction by the bifurcated end of the axle 102, and, in the opposite direction, by a collar 127 pinned upon the shaft 128, upon which the wheel 3 turns. At one side, the cam ring 117 is provided with a grooved extension or jaw 129, in the groove of which is fixed the lower end 130 of an angle-piece, the securing means being a bolt-pin 131 passing through the flanges of the jaw 129 and through said angle-piece 130, and a bolt-pin 132 which passes through the flat face of the angle-piece 130 into the member 129, the said two bolts extending at a right-angle to each other and thereby making a very strong connection between the cam ring 117 and the angle-piece 130. The upper end 133 of the angle-piece is overturned in parallelism with the cross-bar 95, and is arranged in front of the crank-arm 97 carried by the rod 46. The member 133 of the angle-piece is provided with a ball-pin suitably formed and secured thereto and indicated by 134, the ball-end 135 of which enters and operates in a flared socket in the cross-bar 95, thus making a universal joint between the two.

From the foregoing construction it will be seen that, when the service pedal 9 is operated, thus turning the shaft 10, and operating the pinions 43, lugs 42 will move away from lugs 35 on disks 34, and the pinions will drive the racks 44 and bars 45 longitudinally, move the rods 46 forwardly, thus actuating the cross-bar 95, which in turn transmits its motion to the angle-pieces 130, 133, thus imparting rotary motion to the cam rings 117 causing the latter to shift the slides 119 along the angular bushings 136, which latter prevent the slides 119 from rotating. The shifting of the slides 119 by the cam rings 117 causes the brake members 111 to engage the brake members 112 without separating the cooperating ratchet teeth 109—110. By thus bringing the brake members 111 and 112 together, ample friction is set up between the parts for all ordinary service purposes to brake the vehicle and slow its momentum, or bring it to a standstill, and this without permitting rotation of the brake disks 111. When, however, the emergency mechanism is operated, as by elevating the sector 13 and thereby releasing the frame 30, and, through the arms 59 rotating the slide-bars 45, the rods 46 will be rotated, thus shifting the crank-arms 97 circularly, bringing the cams 99 into operation upon the end of the pins 100, see Figure 14, which in turn will depress the arms 104 of the yoke levers, causing the latter to shift the ratchet rings 108, thus completely separating the interacting ratchet teeth 109—110 and completely releasing the brake disks 111. The brake disks 111 being thus released and being in frictional engagement with the disks 112, the latter will frictionally drive the brake disks 111, thus rotating the same on the sleeves 119, the interacting screw-threads of which two members will quickly shift the brake disks 111 with increasing friction against the brake disks 112 as long as the vehicle remains in action. And it will be understood that the higher the speed of the vehicle the quicker the braking contact will be made between the brake members 111, 112 and the greater the increment of friction will be until the vehicle is brought to a standstill. At the same time that the foregoing operation takes place, the emergency mechanism thus set in operation causes the rotation of the sleeves 32, which in turn rotate the disks 34, the lugs 35 of which, acting upon the lugs 42 of the pinions 43, will cause the latter to operate upon the racks 44 of the bars 45 and shift the same longitudinally simultaneously with the rotary movement imparted thereto through the medium of the frame 30 and links 59 and arms 52. The shifting movement of the slide-bars 45 is transferred to the rods 46 simultaneously with the rotary or twisting movement imparted thereto. Thus, the same action takes place upon the cam rings 117 as previously described with reference to the service brake operating mechanism, thus shifting the slides 119 so that, in addition to the rotary movement imparted to the brake disks 111 by the springs 124, said brake disks are shifted bodily laterally, which insures the complete separation of the ratchet teeth 109—110, as shown in Figure 14. Thus, when the service operating mechanism is set in action, only the cam rings of the several brake mechanisms are set in operation, and hence only bodily shifting the several brake disks into frictional contact with their stationary co-operating disk members, because the ratchet teeth of the several ratchet rings are not separated from the ratchet teeth of the several brake disks. When, however, the emergency operating mechanism is set in action, all the foregoing movements take place, and, in addition thereto, the several ratchet rings are shifted bodily on the carrying slides toward the cam rings, this action separating the ratchet teeth of the ratchet rings from the ratchet teeth of the brake disks and leaving the latter free to rotate, the rotation being brought about by the frictional contact of the two brake disks, thus bringing into play the screw-threads between the shiftable brake disks and the slides, causing the shiftable brake disk to increase friction upon the fixed brake disks and at the same time, winding up the torsional springs connected to the slides and shiftable brake disks. This increases friction between the two brake disks with rapidly increasing increment.

Inasmuch as the brake actuating mechanism for the rear wheels and front wheels is duplicated on opposite sides of the vehicle frame, the brakes, when actuated by the service operating means, will be applied on all four wheels, and, when actuated by the emergency operating means, will be applied on all four wheels; or, in other words, according to which of the mechanisms is thrown into action, the brake mechanism will operate either for regular service or for emergency purposes. Having thus described the details of my invention, the following brief description of mode of operation will be readily understood:

As shown in the drawings, the brake mechanism is identical on both hind wheels, and the brake actuating mechanism for the hind wheels is duplicated on opposite sides of the vehicle. Also, the brake mechanism is identical on the two front wheels, and the brake actuating mechanism for the front wheels is duplicated on opposite sides of the vehicle. The brake mechanisms, or devices, on all four wheels are substantially the same; but, the actuating mechanism for the brake mechanism on the front wheels, though duplicated on opposite sides of the vehicle, is different from the actuating mechanism for the brake mechanism on the two rear wheels. The actuating mechanisms for the brake mechanisms, on both front and hind wheels, are set in motion, operated or impelled by two independent operating means, the one being, for service purposes, the treadle 9, shaft 10, pinions 43, racks 44, and rotary and reciprocating bars 45, with actuating connections fore and aft to the respective brake mechanisms; and the other being, for emergency purposes, the manually operated sector 13, rod 19, lever 23—24, connection 25, latch-lever 26—29, frame 30, sleeves 32, disks 34, lugs 35 and 42 interacting to drive the pinions 43, racks 44, and rotary and reciprocating bars 45, plus the links 59 from frame 30 to arms 52, carried by slide-bars 45, with actuating connections fore and aft, as previously described. The two operating mechanisms just referred to are located approximately centrally of the vehicle, or conveniently for manipulation by the operator, and are operated, as occasion may demand, either for service purposes or emergency purposes, the operating mechanism extending to opposite sides of the vehicle and being connected by like parts and elements to the two sets of rods on the opposite sides of the vehicle, which in turn are connected to the sets of brake mechanisms at front and rear of the vehicle.

Referring now to Figures 1 to 5, inclusive, the treadle-operated means for setting the brakes for service purposes will be described. As occasion demands, and inasmuch as it is seldom necessary to unduly speed the operation of the brakes for service purposes, the treadle 9 may be pressed downwardly by the foot of the operator which will turn the shaft 10 counter-blockwise, thus turning the pinions 43 counter-blockwise, or in the direction of the arrow shown thereon in Figure 4, thus separating the lugs 42 from the lugs 35 on the disks 34. The pinions actuate the racks 44 in the direction of the arrow adjacent thereto, thus pulling upon the rods 47 to actuate the rear wheel brake mechanisms and pushing upon the rods 46 and cross-bar 95 to actuate the front wheel brake mechanisms.

Now, referring to Figures 9 to 12, inclusive, and Figure 19, it will be seen that the pull of the slide-bars 45 upon the rods 47 and 48, upon opposite sides of the vehicle, will actuate the slide-bars 82 of the rear wheel brake mechanisms, thus shifting the clamp collars 87 and the cam rings 78. The rotary motion thus given to the cam rings 78 will cause the same to shift the slides 71 laterally or outwardly, thus bodily shifting the brake disks 69 into contact with the brake disks 61, without losing connection between the interacting ratchet teeth 76 and 73 on the ratchet rings 75 and brake disks 69, respectively. Consequently, the brake disks 69 cannot be rotated, and the springs 64, in consequence, are merely compressed by the brake disks 69. Thus friction is applied by brake disks 69 to brake disks 61 by merely driving the former in a right-line into engagement with the latter and causing frictional contact of the disks throughout their entire facial area. This is sufficient for all service purposes, and the brake disks 69 are quickly set in action and caused to perform their functions. Now, viewing Figures 13 to 17, inclusive, it will be seen that the push exerted by the slide-bars 45 upon the connecting rods 46 will shift forwardly the cross-bar 95, which in turn will actuate the angle-pieces 133 and thereby give to the cam rings 117 circular motion, resulting in shifting the slides 119 laterally or outwardly, thus forcing the brake disks 111 into contact with the brake disks 112 without separating the interacting ratchet teeth 109—110 on the ratchet rings 108 and brake disks 111, respectively. Thus the brake disks 111 are shifted in a right-line into contact with brake disks 112 in manner identical with that described with reference to the rear wheel brake mechanism, and all four of the brake mechanisms will be applied simultaneously and to the same degree, under proper adjustment of the operating and actuating mechanisms. Assuming now that an emergency arises necessitating the operation of the emergency mechanism, the operator quickly reaches his fingers or hand to the sector 13 and pulls upwardly thereon, still holding the steering wheel 7. The rod 19 is thereby drawn upwardly longitudinally, which rocks the lever 23—24, which in turn pulls the connection 24, in turn actuating the latch lever 26—29, releasing the frame 30. The release of the frame 30 sets two mechanisms simultaneously into operation. The first mechanism comprises the sleeves 32 turning on the shaft 10, the disks 34 having lugs 35, the lugs 35 engaging the lugs 42 on the pinions 43, the latter actuating the bars 45 through the medium of the racks 44, thus imposing a pushing action in a right-line upon the rods 46 and a pulling action in a right-line upon the rods 47—48 and slide-bars 82. As previously described with reference to the pedal operated means, the brake disks 69, 61 for the rear wheels and the brake disks 111 and 112 for the front wheels are simultaneously brought into frictional contact; but, without separating the respective interacting ratchet mechanisms shown in Figures 18 and 19, for example. Simultaneously with this operation, the frame 30, rising or swinging about the shaft 10 as a fulcrum, draws inwardly and upwardly the links 59, which in turn actuate the arms 52, which give to the slide-bars 45 a rotary motion which does not interfere with the longitudinal motion simultaneously imparted thereto by the turning of the sleeves 32. The rotary motion thus imparted to the slide-bars 45 simultaneously rotates the connecting rods 46, 47, 48 and the slide-bars 82 at the rear wheels. The rotation of the slide-bars 82 actuates the yokes 81, arms 80 thereof, and shifts inwardly toward each other the respective ratchet rings 75, so as to separate the ratchet teeth 76, 73 on the rings and brake disks 69, respectively. This separation of the ratchet teeth entirely releases the brake disks 69, which immediately rotate upon the slides 71 causing the interacting screw-threads of these parts to rapidly shift the brake disks 69 laterally into increased frictional engagement with the brake disks 61, and with rapidly increasing increment as the motion of the vehicle continues, and until the vehicle is brought to a standstill. Soon as the vehicle is brought to a standstill, the springs 64, which have, on account of the rotation of the disks 69, been wound up, or had power stored therein, will tend to uncoil and expand and thus operate to reverse the action of the brake disks 69 upon the slides 71, and shift the brake disks 69 laterally away from the brake disks 61. The interacting ratchet teeth will then automatically re-engage. Similar actions take place at the front wheels; that is to say, when the rods 46 are rotated, as just described, by the slide-bars 45, the crank-arms 97 are rotated, which moves cams 99 into contact with the pins 100, thus depressing the pins and the arms 104 of the yoke levers, thus causing the yoke arms 107 to shift laterally the ratchet rings 108, thus completely separating the teeth 109 thereof from the teeth 110 on the brake disks 111, thus permitting the brake disks 111 to rotate on and relatively to the slides 119, causing the brake disks 111 to be shifted laterally against the brake disks 112 with greater force and with rapidly increasing increment of friction as long as the vehicle remains in operation, the rotation of the brake disks 111 winding up the coil springs 124 and storing power therein. Soon as the vehicle is brought to a stop, the springs 124 tend to uncoil and expand and to thus operate to reverse the action of the brake disks 111, and to shift the latter from frictional engagement with the brake disks 112, ultimately bringing about the release or separation of the respective brake disks. Reversal of movement of the operating mechanisms thus described for the actuating and brake mechanisms will reverse the action of the respective cam rings, thus shifting the slides reversely and shifting the movable brake disks away from the fixed brake disks and restoring the brake mechanisms to normal position such as shown in Figures 9 and 13, respectively. The ratchet rings will also be shifted reversely, the ratchet teeth again interacting to hold the movable brake disks from rotation. The position of the respective brake mechanisms, when fully applied, is shown in Figures 10 and 14, respectively, and Figures 18 and 19 show the interacting relation of the ratchet parts of the respective mechanisms, Figure 18 illustrating the ratchet mechanism of Figures 9 and 10, for example, and Figure 19 illustrating the ratchet mechanism of Figures 13 and 14, for example. The grooves 115 in the ratchet rings permit the latter to be shifted by the yoke levers without binding or cramping.

Thus it will be seen that, under the proper timing, adjustment and setting of the brake mechanisms, their actuating means, and the operating devices for the latter means, all four brake mechanisms may be applied simultaneously to the respective wheels for service purposes and may also be applied simultaneously to all four wheels for emergency purposes. When the brakes are applied for service purposes, the movable disks 69 and 111 are merely shifted laterally; but, when emergency demands, the said brake disks are shifted both laterally and circularly, and, when the latter movement is imparted to the brake disks, the friction between the movable and fixed brake disks is applied with rapidly increasing increment during the travel of the vehicle. This is an important feature of my invention, and upon it I desire to lay great stress. I also desire to lay stress upon the fact that the friction produced is between two plane, or parallel plane, surfaces of large area, as distinguished from a brake mechanism which embodies a brake band or brake rings. Thus, uneven wear is avoided and friction is applied equally throughout the entire area of the cooperating surfaces of the braking members. Moreover, the engaging surfaces of the brake disks are always in parallel planes, parallel with the sides of the wheels, which prevents clogging of the brake members and reduction of efficiency; and any substance which, by accident, enters between the disks will either fall out immediately or be ultimately ground out or centrifugally thrown out. Again, if, by chance, the cooperating surfaces of the brake disks should be uneven, or have burrs, or rough spots, the interaction of the brake disks will quickly eliminate the same and produce even frictional surfaces. Hence, in operation, the brake mechanisms automatically "tune" themselves for greatest efficiency. Also, the brake mechanisms cannot become overheated, cannot catch on fire, and injury from these sources is avoided, since the brake disks are entirely exposed to the atmosphere and are constantly cooled by agitation of the air and motion of the vehicle. Another important feature of my invention is that a brake mechanism adapted to a motor vehicle and applied to all four wheels, in accordance with my invention, practically eliminates skidding, since the braking action is applied approximately to the extremes of the vehicle and all parts of the vehicle instantly respond to the braking action of the braking devices; this as distinguished from applying the brake mechanism to one pair of wheels leaving the other pair of wheels, and the end of the vehicle carrying them, entirely free to jump about and cause skidding. With my brake mechanism, the brakes are applied to, so to speak, all four corners of the vehicle, and the momentum of all parts of the vehicle is simultaneously, and, in corresponding degree, instantly overcome. Skidding thus becomes impossible. In addition to the foregoing, a vehicle provided with my brake mechanism is not subjected to twisting, breaking or unequal strains which, as in ordinary vehicles, when the brakes are applied, are cumulative due to momentum and inertia throughout the entire length of the vehicle. With my brake mechanisms applied to the vehicle, there is no such thing as a tendency of one part of the vehicle to override or crumple up upon the other part. Hence, all extraordinary and unusual strains, torques and twisting forces are eliminated, giving to the vehicle and all its parts unusual stiffness and rigidity, and, including tires, longer life, greater durability and eliminating tendencies to loosening of parts and consequent rattle, quite common in even high grade cars.

Having thus described my invention, what I claim and desire to secure by Letters Patent is:

1. A brake mechanism for road vehicles comprising a plurality of flat friction producing members of large area arranged in pairs and operable upon all four wheels of the vehicle, and means for controlling the operation of the said members including a service device, the said members being mounted so that one of each pair shall have bodily movement in a right line relatively to the other, and the members of the pairs shall have simultaneous frictional contact throughout their functional surfaces.

2. A brake mechanism for road vehicles comprising a plurality of flat friction producing members of large area arranged in pairs and operable upon all four wheels of the vehicle, and means for controlling the operation of the said members including a service device, the said members being mounted so that one of each pair shall have bodily movement in a right line relatively to the other, and the members of the pairs shall have simultaneous frictional contact throughout their functional surfaces, and automatic means for separating the pairs of members when the service device is released.

3. A brake mechanism for road vehicles comprising a plurality of flat friction producing members of large area arranged in pairs and operable upon all four wheels of the vehicle, and means for controlling the operation of the said members including a service device, the said members being mounted so that one of each pair shall have bodily movement in a right line relatively to the other, and the members of the pairs shall have simultaneous frictional contact throughout their functional surfaces, and a cushion device between the pairs of said members which is compressed when the service device is operated and which separates the said members when the service device is released.

4. A brake mechanism for road vehicles comprising a plurality of friction producing members arranged in pairs and operable upon all four wheels of the vehicle, and means for controlling the operation of the said members including both service and emergency devices, the said members being mounted so that one of each pair shall have both right-line and rotary movements.

5. A brake mechanism for road vehicles capable of use as a service brake and also as an emergency brake, means whereby, when the brake is used for service purposes, it is shifted laterally, and means whereby, when it is used for emergency purposes, it is rotated.

6. A road vehicle having brake mechanism including members mounted relatively to the wheels thereof, means for holding the brake members normally inactive, means for releasing the brake members, and automatic means for rotating the brake members to apply friction to stop the vehicle.

7. A road vehicle having brake mechanism including members mounted relatively to the wheels thereof, means for holding the brake members normally inactive, means for releasing the brake members, and automatic means for rotating the brake members to apply friction with increasing increment during the movement of the vehicle.

8. A brake mechanism for road vehicles comprising a plurality of friction producing members arranged in pairs and operable upon all four wheels of the vehicle, and means for controlling the operation of the said members including both service and emergency devices, the said members being mounted so that one of each pair shall have both right-line and rotary movements relatively to the other and the members of the pairs shall have frictional contact throughout their functional surfaces, and automatic means for separating the members of the pairs when either of the controlling devices is released.

9. A brake mechanism for road vehicles comprising a plurality of friction producing members arranged in pairs and operable upon all four wheels of the vehicle, and means for controlling the operation of the said members including both service and emergency devices, the said members being mounted so that one of each pair shall have both right-line and rotary movements relatively to the other and the members of the pairs shall have frictional contact throughout their functional surfaces, and a cushion device between the members of the pairs which may be compressed in different angular directions according to which service device is operated and which separates said members of the pairs when the controlling devices are released.

10. A brake for road vehicles comprising brake mechanism for a plurality of the wheels, including a slide carrying a rotary brake member and also a cam flange, and a cam ring cooperating with said flange, and means for operating the cam ring circularly relatively to said slide to shift the slide laterally and drive the brake member into action.

11. A brake mechanism for road vehicles comprising a brake mechanism for a plurality of the wheels, including a slide carrying a rotary brake member, cam means for shifting the slide and brake member laterally, and means for rigidly holding the brake member from any other movement during its shifting movement.

12. A brake mechanism for vehicles comprising brake mechanism carried by a plurality of the wheels including a slide, means for shifting the same laterally, a brake member rotatably mounted upon the slide, and means whereby to hold the brake member from rotation during the movement of the slide.

13. A brake mechanism for road vehicles, including a slide, means for operating the slide, a brake member rotatably mounted upon the slide, means for locking the brake member against rotary movement, and means for shifting the locking means to release the brake member whereby the brake member may have both rotary and lateral movement in operation.

14. A brake mechanism for road vehicles comprising a slide and means for shifting the same, a brake member rotatably carried by the slide, a ratchet mechanism for holding the brake member against rotary movement, and means for releasing the ratchet mechanism to permit the brake member to have rotary movement simultaneously with its shifting movement with said slide.

15. A brake mechanism for road vehicles including a member adapted to have rotary and laterally shifting movements, a slide carrying said member, and means whereby to shift the slide and member laterally and permit the member to have rotary movement on the slide while the vehicle is in motion.

16. A brake mechanism for road vehicles including a rotary member, a slide carrying said member, and means for shifting the slide and setting the rotary member in operation with increasing increment of friction during the movement of the vehicle.

17. A brake mechanism for road vehicles comprising a plurality of friction producing members arranged in pairs and operable upon all four wheels of the vehicle, and means for controlling the operation of the said members including both service and emergency devices, the said members being mounted so that one of each pair shall have both right-line and rotary movements relatively to the other and the members of the pairs shall have frictional contact throughout their functional surfaces, and a torsional and compressible spring interposed between the members of the pairs adapted to reverse the right-line and rotary movements of the said members upon release by the controlling means, thus restoring the said members to normal position.

18. A brake mechanism for road vehicles comprising a normally locked brake member, automatic actuating mechanism for said member adapted to shift the same in a right-line and rotatively for braking action, and operating means for releasing said brake member including a manual device for setting the releasing means in operation.

19. A brake mechanism for road vehicles comprising a normally locked brake member, automatic actuating mechanism for said member adapted to shift the same in a right-line and rotatively for braking action, and operating means for releasing said brake member including a treadle for setting the releasing means in operation.

20. In combination with a road vehicle and its steering mechanism, a brake mechanism having a normally locked brake member, and means cooperating with and partly extending through the steering mechanism for releasing the brake member and setting the brake mechanism in operation.

21. In combination with a road vehicle, a brake mechanism applied to all the wheels of the vehicle, and means for simultaneously setting the brake mechanisms in operation, including a reciprocating slide carrying a rotary brake member, and means whereby each of the brake members is caused to rotate on its slide and go into action with increasing increment of friction as long as the vehicle runs.

22. A brake mechanism for road vehicles comprising a brake member fixed to one of the wheels of the vehicle, a second brake member adapted to rotate and reciprocate relatively to the fixed brake member, means for setting the second brake member in operation including means for shifting the same laterally and releasing it, so that it may rotate and apply friction to the first brake member with increasing increment of friction as long as the vehicle runs.

23. In combination with a road vehicle, a brake mechanism adapted to be applied to the front wheels thereof, said brake mechanism including a cross-bar, a cam ring universally jointed to the cross-bar, a slide having a cam flange cooperating with the cam ring, and also carrying a brake member, and means whereby to shift the cross-bar to actuate the cam ring.

24. A brake mechanism for road vehicles comprising a rotary, laterally reciprocating, friction applying disk, means for shifting the disk laterally to cause it to apply friction, means for releasing the disk for rotation to apply friction with increasing increment during its rotation, and means for returning the disk to normal position when released.

25. A brake mechanism for road vehicles including disk members of like character associated with the rear wheels of the vehicle for frictional engagement, a reciprocating slide carrying one of the disks and on which the latter rotates, a treadle operated device and a hand operated device for selectively actuating said brake mechanisms, connecting means between the several brake mechanisms and the two actuating devices and common to both of said actuating devices, whereby when either one of the actuating devices is operated the rotary disk of the several brake mechanisms will be driven in a right-line into frictional engagement with the complemental disk and then rotated for braking action.

26. A brake mechanism for road vehicles including disk members of like character associated with the front wheels of the vehicle for frictional engagement, a reciprocating slide carrying one of the disks and on which the latter rotates, a treadle operated device and a hand operated device for selectively operating said brake mechanisms, connecting means between the several brake mechanisms and the two actuating devices and common to both of said actuating devices, whereby when either one of the actuating devices is operated the rotary disk of the several brake mechanisms will be driven in a right-line into frictional engagement with the complemental disk and then rotated for braking action.

27. A brake mechanism for road vehicles including disk members of like character applied to all four wheels of the vehicle for frictional engagement, a reciprocating slide carrying one of the disks and on which the latter rotates, a treadle operated device and a hand operated device for selectively operating said brake mechanisms, connecting means between the several brake mechanisms and the two actuating devices and common to both of said actuating devices, whereby when either one of the actuating devices is operated the rotary disk of the several brake mechanisms will be driven in a right-line into frictional engagement with the complemental disk and then rotated for braking action.

28. A brake mechanism for vehicles including members of similar character applied to all four wheels, actuating means for the rear wheel brake members, actuating means for the front wheel brake members, and operating means for the several actuating means adapted to impart both a rotary and reciprocatory movement thereto.

29. A road vehicle having brakes applied to its wheels adapted for both service and emergency purposes, including a right-line reciprocating slide carrying a rotary-reciprocating disk locked thereon, a steering mechanism for the vehicle at the seat of the latter, a treadle also accessible from the seat of the vehicle, mechanism combined with the treadle whereby to shift the slide and apply the brake mechanism for service purposes, and mechanism combined with the steering mechanism whereby to shift the slide and unlock the disk and apply the brake for emergency purposes.

30. A road vehicle having brakes applied to its wheels, said brakes including a right-line reciprocating and a rotary frictional member, means accessible to the operator at the seat of the vehicle for moving the frictional member in a right-line to apply friction for service purposes, a steering mechanism accessible to the operator at the seat thereof, and means combined with the steering mechanism for releasing the brake member to enable it to apply friction for emergency purposes by a rotary motion thereof.

31. In combination with a road vehicle, a brake mechanism therefor including two friction-producing disks, one of which is rigidly secured to a wheel of the vehicle and the other of which is adapted to rotate and have right-line reciprocations relatively to the first mentioned disk, means for normally separating the friction disks, and means for actuating the second named disk in a right-line into contact with its cooperating disk in opposition to said separating means.

32. In combination with a road vehicle, a brake mechanism therefor including two friction-producing disks, one of which is rigidly secured to a wheel of the vehicle and the other of which is adapted to rotate and have right-line reciprocations relatively to the first mentioned disk, means for normally separating the friction disks, means for actuating the second named disk in a right-line into contact with its cooperating disk in opposition to said separating means, and means for rotating the second named disk for creating friction between the two disks with gradually increasing increment during the movement of the vehicle.

33. A brake mechanism for vehicles comprising two frictional disks, one of which is fixed relatively to the other, a slide carrying the latter disk, means for reciprocating the slide, and means whereby the disk carried by the slide may rotate upon the slide and simultaneously move parallel therewith.

34. A brake mechanism for vehicles comprising two frictional disks, one of which is movable relatively to the other, a slide carrying the movable disk, means for reciprocating the slide to bodily shift the disk, means for holding the disk from rotary movement during said reciprocating movement of the slide, and means whereby to release the movable disk for rotary movement relatively to the slide.

35. A brake mechanism comprising two friction-producing disks, one of which is movable relatively to the other, a spring housed by said disks for normally separating them and for giving the movable disk rotary movement, means for shifting the movable disk in opposition to the spring, and means for rotating the disk in opposition to the spring.

36. A brake mechanism comprising two friction-producing disks, one of which is movable relatively to the other, a spring housed by said disks for normally separating them and for giving the movable disk rotary movement, means for shifting the movable disk in opposition to the spring, means for rotating the disk in opposition to the spring, and simultaneously storing up power in said spring so that, when the movable disk is released from the other disk, the spring may impart reverse rotation thereto.

37. Brake actuating mechanism including a rocking frame, a latch for holding the frame in normal position, a spring normally tending to actuate the frame, and manual means for shifting the latch to release the frame.

38. Brake actuating mechanism including a rocking frame, a latch for holding the frame in normal position, a spring normally tending to actuate the frame, manual means for shifting the latch to release the frame, and means to restore the frame to normal position for engagement by the latch.

39. Brake actuating mechanism including a rotary reciprocating bar, a worm carried by the bar, a crank-arm mounted on the bar, a worm-wheel meshing with the worm, a shaft carrying the worm-wheel, and a treadle carried by the shaft for rotating the latter.

40. Brake actuating mechanism including a rotary reciprocating bar, a worm carried by the bar, a crank-arm mounted on the bar, a worm-wheel meshing with the worm, a shaft carrying the worm-wheel, a treadle carried by the shaft for rotating the latter, a rocking frame, a sleeve carried thereby, and means between the sleeve and worm-wheel for causing one to actuate the other.

41. Brake actuating mechanism including a rotary reciprocating bar, a worm carried by the bar, a crank-arm mounted on the bar, a worm-wheel meshing with the worm, a shaft carrying the worm-wheel, a treadle carried by the shaft for rotating the latter, a rocking frame, a sleeve carried thereby, means between the sleeve and worm-wheel for causing one to actuate the other, a spring normally tending to actuate the frame, a latch normally holding the frame against the tension of the spring, and manual means for tripping the latch.

42. A brake mechanism applied to a plurality of wheels of a road vehicle, the same comprising frictional members carried by the wheels and relatively movable frictional members adapted to cooperate with the first named frictional members, a bar extending across the vehicle, means for bodily reciprocating the bar at an angle to its length, said means adapted to rotate relatively to the bar and carrying cam members, means between the cam members and the movable frictional members, and means between the cross-bar and movable members whereby said movable frictional members may be shifted into engagement with the relatively fixed members.

43. A brake mechanism for road vehicles comprising frictional members applied to two of the wheels of the vehicle, relatively movable frictional members adapted to cooperate with the first named members, means for actuating the movable frictional members including a rotary reciprocating bar for shifting the movable brake members into engagement with the other brake members, and common means for rotating and reciprocating the said bar.

GEORGE E. MOLYNEUX.